Jan. 2. 1945.  N. S. FOCHT  2,366,248
SHOCK ABSORBER
Filed Feb. 24, 1943  2 Sheets-Sheet 1
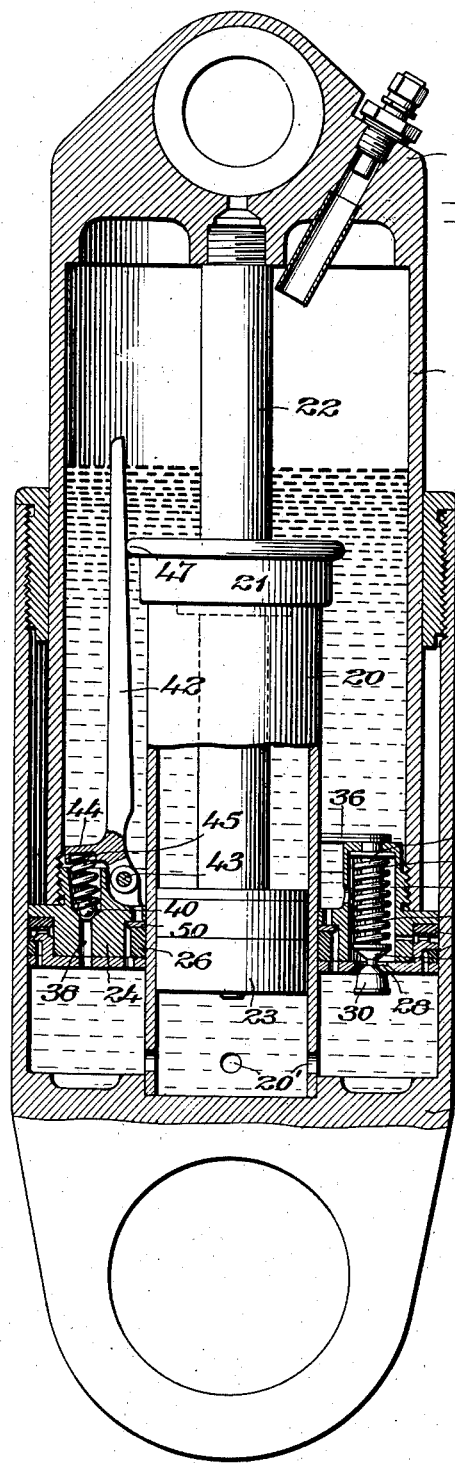
Inventor
Nevin S. Focht,
By Wolhaupter & Groff
Attorneys Jan. 2. 1945.  N. S. FOCHT  2,366,248
SHOCK ABSORBER
Filed Feb. 24, 1943  2 Sheets-Sheet 2
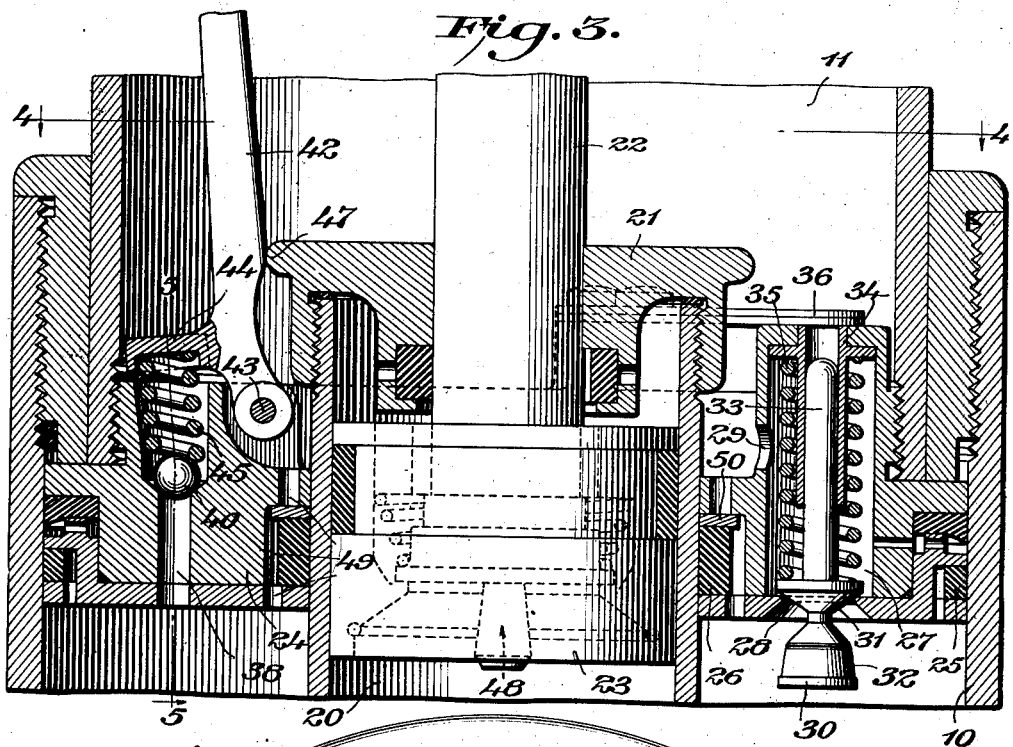
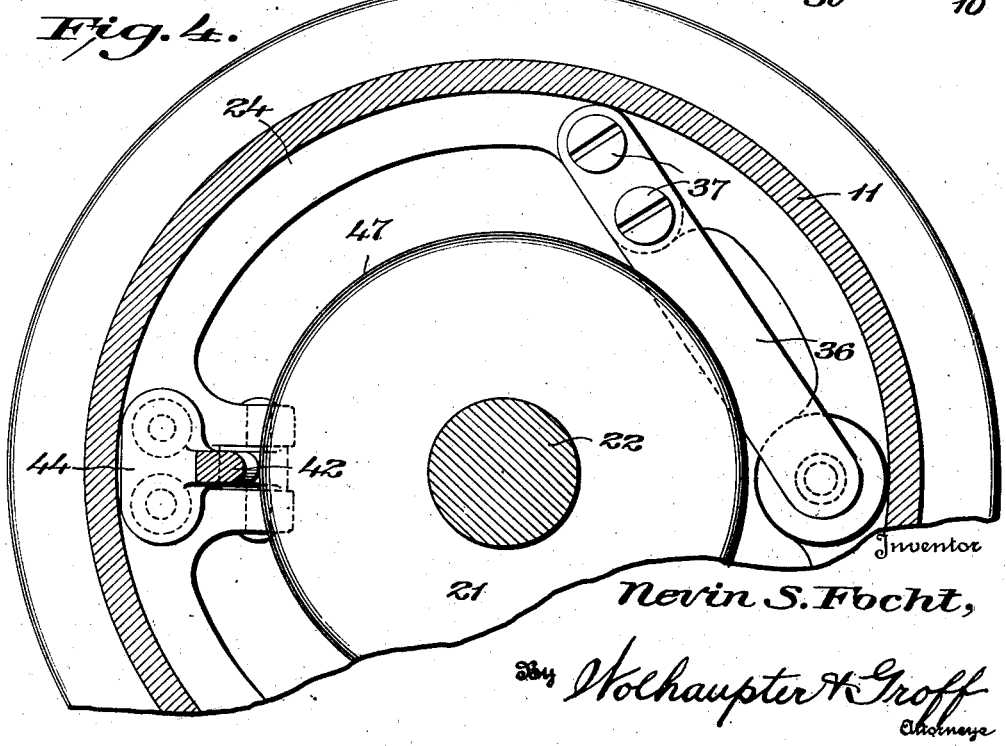
Inventor
Nevin S. Focht,
By Wolhaupter & Groff
Attorneys Patented Jan. 2, 1945

2,366,248

UNITED STATES PATENT OFFICE 2,366,248

SHOCK ABSORBER

Nevin S. Focht, Syracuse, N. Y.

Application February 24, 1943, Serial No. 476,963

6 Claims. (Cl. 267—64)

This invention relates to hydraulic shock absorbers, particularly for use on aircraft, although capable of other uses, and has for one of its special and more important objects to provide a hydraulic shock absorber embodying an adjustable metering pin and novel means whereby said pin is adjustable in response to liquid pressures generated in the shock absorber by impact shocks imposed thereon to regulate shock absorbing flow of the liquid in the shock absorber proportionately to the severity of the shocks in substantially all stroke positions of the shock absorber, whereby the shock absorber is highly efficient in cushioning or absorbing substantially all impact shocks imposed thereon regardless of their time of occurrence with reference to the stroke position of the shock absorber and regardless of their severity within, of course, the capacity of the shock absorber to resist them.

Another special and important object of the invention is to provide a hydraulic shock absorber embodying yieldably closed pop-off valve means to be opened by excessively high pressures generated in the shock absorber by extraordinarily sever impact shocks imposed thereon, thus to relieve such pressures, and to provide novel control means for progressively increasing and decreasing the yieldable closing force exerted on said pop-off valve means in harmony with stroke movements of the shock absorber under impact loads imposed thereon and recoil, respectively, to obtain safe, maximum shock absorption value for each different stroke position of the shock absorber and to cause the shock absorber to function substantially uniformly throughout its total stroke in cushioning or absorbing shocks imposed thereon.

Another special object of the invention is to provide a shock absorber embodying an adjustable metering pin and pop-off valve means as stated which is highly efficient in cushioning or absorbing impact shocks imposed thereon and which, at the same time, affords a soft, flexible taxiing condition for an airplane upon which it may be used.

With the foregoing and other objects in view, which will become more fully apparent as the nature of the invention is better understood, the same consists in a shock absorber embodying the novel features of construction, combination and arrangement of parts as will be hereinafter more fully described, illustrated in the accompanying drawings and defined in the appended claims.

In the accompanying drawings, wherein like characters of reference denote corresponding parts in the different views—

Figure 1 is a side elevational of a shock absorber constructed in accordance with one practical embodiment of the invention and incorporated in an airplane landing gear of the lever suspension type.

Figure 2 is a central, longitudinal section through the shock absorber on an enlarged scale.

Figure 3 is a central, longitudinal section through a portion of the shock absorber on a further enlarged scale.

Figure 4 is a cross section on the line 4—4 of Fig. 3; and

Figure 5 is a detail, longitudinal section on the line 5—5 of Fig. 3.

Referring in detail to the practical embodiment of the invention illustrated in the drawings, it will be observed that the shock absorber is of the cylinder and piston type comprising a cylinder 10 and a piston 11 which are slidable longitudinally relative to each other; that the piston 11 is in the form of a hollow cylinder, and that heads 12 and 13 close the lower and the upper ends of said cylinder and piston, respectively, and are formed for connection with a pair of elements which are movable toward and away from each other under impact and recoil forces imposed thereon to adapt the shock absorber to resist such forces.

Figure 1 of the drawings illustrates one practical manner of installing the shock absorber for use in an airplane landing gear of the lever suspension type. Such a landing gear may comprise, as shown, a strut 14 fixed to and depending from the fuselage 15 of the airplane, and an arm 16 pivoted at its upper end to the lower end of the strut 16 and extending diagonally comprise, as shown, a strut 14 fixed to and depending from the fuselage 15 of the airplane, and an arm 16 pivoted at its upper end to the lower end of the strut 15 and extending diagonally downwardly and rearwardly from said strut 14 and carrying at its lower or outer end a landing wheel 17. The strut 14 and the arm 16 comprise the aforementioned members which are movable toward and away from each other under impact and recoil forces imposed thereon, and in order to adapt the shock absorber to resist such forces the head 12 at the lower end of the cylinder 10 may be pivotally connected, as indicated at 18, to the arm 16 at any desired point spaced outwardly therealong from its pivotal connection with the strut 15, and the head 13 at the upper end of the piston 11 may be pivotally connected, as indicated at 19, with the strut 14 at any desired point spaced above the point of pivotal connection of the arm 16 therewith. The shock absorber thus serves as a telescopic strut between the strut 14 and the arm 16 and by its telescopic action in response to upward and downward swinging movement of the arm 16 as the weight of the airplane is imposed upon and removed from the landing wheel 17, acts to cushion or absorb the forces which produce said movements of the arm 16.

Alternatively, the shock absorber may be connected at its upper end to the fuselage of an airplane and at its lower end may carry a landing wheel, or it may be installed for different uses in various different ways without changing its general mode of operation.

Referring now in detail to the mechanism of the shock absorber, it will be observed that the head 12 of the cylinder 10 has fixed thereto and extending upwardly therefrom, centrally thereof, a smaller cylinder 20 which is closed at its upper end by a head 21, and that fixed to and extending downwardly from the head 13 of the piston 11, centrally thereof, is a piston rod 22 which extends through a central opening in the head 21 into the cylinder 20 and within said cylinder 20 carries a piston head 23. In addition, it will be observed that the lower ends of the cylinders 10 and 20 are in communication with each other as, for example, through openings 20' in the cylinder 20.

It will further be observed that the lower end of the piston 11 has fixed thereto a ring-like piston head 24 which is disposed in the cylinder 10 in surrounding relationship to the cylinder 20 and which is provided with suitable packings 25 and 26 to afford liquid-tight seals between the same and said cylinders 10 and 20.

In the piston head 24 is a longitudinally extending bore 27 which is in communication with the cylinder 10 through a liquid metering orifice 28 in the lower end of said piston head and with the interior of the piston 11 through an opening 29 in an inner side portion of said piston head which is spaced outwardly from the cylinder 20.

A metering pin 30 includes a disk-like valve portion 31 disposed in the bore 27 to close downwardly upon a seat surrounding the orifice 28, thus to close said orifice, and further includes, below the valve portion 31 thereof, a portion 32 of different cross sectional areas at different points along its length for cooperation with the orifice 28 to vary the effective area thereof. Moreover, said metering pin includes a stem 33 extending upwardly from the valve portion 31 thereof into a guide tube 34 which may be either integral with or separate from the piston head 24. In adddition, a spring 35 tends constantly to urge the metering pin 30 downwardly to its limit of downward movement in which its valve portion 31 closes the orifice 28, and suitable stop means is provided to limit upward movement of said pin against the force of the spring 35, said stop means being afforded, for example, by the lower end of the guide tube 34 which is engageable by the valve portion 31 of said metering pin.

The guide tube 34 opens through the top of the piston head 24 and the stem 33 of the metering pin 30 is of a length such that its upper end is projected above the upper end of said guide tube by a predetermined amount of upward movement of said metering pin. Moreover, a leaf spring 36 is anchored at one end to the top of the piston head 24 at a point remote from the tube 34, as indicated at 37, and has its other or free end overlying the upper end of said tube to be engaged by the upper end of the metering pin stem 33 when the said upper end of said stem is projected above the top of said tube.

At a point suitably spaced from the bore 27 the cylinder head 24 has formed therethrough in side to side relationship to each other a pair of small bores 38 and 39 which afford communication between the cylinder 10 and the interior of the piston 11 under the control of a pair of downwardly closing, upwardly opening check valves 40 and 41, respectively, which may be either of the ball type shown or of any other suitable type. In any event, a cam lever 42 extends from the piston head 24 upwardly into the hollow piston 11 and is pivoted at its lower end, as indicated at 43, to said piston head 24 for inward and outward swinging movement; a tongue 44 extends outwardly from said lever into overlying relationship to the valves 40 and 41; coil springs 45 and 46 are interposed between said tongue and said valves, respectively, and react from said tongue to urge said valves closed and from said valves to swing said cam lever inwardly; and inward swinging movement of said lever is limited by suitable stop or cam actuator means such, for example, as a lip 47 at the upper end of the cylinder head 21.

As the cylinder 10 and the piston 11 of the shock absorber move inwardly and outwardly relative to each other the inner edge of the cam lever 42 rides against the lip 47 and, according to the contour of its inner edge, said cam lever assumes a definite position for each different stroke position of the shock absorber, thereby definitely determining the closing force exerted upon the valves 40 and 41 by the springs 45 and 46 for each different stroke position of the shock absorber. In this connection it is pointed out that the contour of the inner edge of the cam lever 42 is such that said lever is swung to its outermost position and thereby places the springs 45 and 46 under maximum compression when the cylinder 10 and the piston 11 are moved to their outermost or fully extended position relative to each other and that in response to inward movement of said cylinder 10 and said piston 11 relative to each other from their outermost position in which the cam lever 42 is in its outermost position, said cam lever is permitted to swing gradually inward to progressively decrease the compression of the springs 45 and 46.

The shock absorber is charged with enough liquid to fill the cylinders 10 and 20 and to cover the piston 24 and the head of the cylinder 20 when the cylinder 10 and the piston 11 are fully extended relative to each other. However, the amount of space within the piston 11 above the level of the liquid therein when the shock absorber is fully extended is more than ample to accommodate all of the liquid that is forced from the cylinders 10 and 20 by inward movement of said cylinders and the pistons 11 and 23, relative to each other to their limit of relative inward movement.

In the piston 23 is a valve mechanism of any suitable type through which liquid flows from the lower end of the cylinder 20 into the upper end of said cylinder when said cylinder and said piston move inwardly relatively to each other, and which serves to regulate or meter return flow of liquid from the upper end to the lower end of said cylinder as said cylinder and the piston 23 move outwardly relative to each other under the influence of recoil forces imposed on the shock absorber, thereby to cause the shock absorber to cushion or absorb such forces. This valve mechanism may be of the same construction and mode of operation as the piston-carried valve mechanism for the same general purpose illustrated, described and claimed in my prior application, Serial No. 463,925, filed October 30, 1942, now Patent No. 2,342,729, issued February 29, 1944, and since no novelty in respect to the same, per se, is claimed herein, it is illustrated only by dotted lines and is designated generally as 48.

One of the springs 45, 46 is stronger than the other and both of said springs are at all times under such compression and are of such strengths that, for each different stroke position of the shock absorber, the valves 40, 41 are maintained closed against the calculated maximum liquid pressure in the cylinder 10 which the shock absorber, in operation under normal conditions, is designed to relieve by metered flow of liquid from the cylinder 10 into the hollow piston 11 through the orifice 28. On the other hand, the yieldable closing forces exerted upon the valves 40, 41 by the springs 45, 46 in each different stroke position of the shock absorber is such that if the pressure of the liquid exceeds the pressure which the shock absorber, in its operation under normal conditions, is designed to relieve by flow of liquid through the orifice 28, one or both of said valves is opened depending upon whether the abnormal pressure is only moderately or excessively high.

Assuming that the shock absorber is installed in an airplane landing gear and is fully extended and that the airplane is landing, the operation of the shock absorber is as follows: upon the wheel 17 striking the ground and the weight of the airplane thereby being imposed upon the shock absorber, the cylinders 10 and 20 and the pistons 11 and 23, respectively, are moved inwardly relative to each other at a velocity depending upon the weight of the airplane and its decending velocity, and as a result the liquid in the lower ends of the cylinders 10 and 20 is subjected to pressure and is forced from the said lower ends of said cylinders. Part of the liquid in the lower end of the cylinder 20 flows through the valve mechanism 48 into the upper end of said cylinder. Due, however, to the presence of the piston rod 22 in the upper end of the cylinder 20 the said upper end of said cylinder cannot accommodate all of the liquid that is forced from the lower end thereof. Therefore, that portion of the liquid in the lower end of said cylinder 20 which cannot be accommodated in said cylinder above the piston head 23, is forced through the openings 20' into the cylinder 10. On the other hand, all of the liquid that is forced from the lower end of the cylinder 10 flows into the hollow piston 11 either through the orifice 28, the bore 27 and the opening 29, or through one or the other or both of the check-valve-controlled bores 38, 39, depending upon the velocity of inward movement of the cylinder 10 and the piston 11 relative to each other and the consequent pressure to which the liquid is subjected.

If the landing is a normal one; i. e., anything less than a crash landing, the pressure and velocity of the liquid is such as not to open either of the valves 40, 41, but to act upon the valve portion 31 of the metering pin 30 to raise said valve portion off said seat and thereby raise said metering pin, thus to cause the portion 32 of said metering pin to cooperate with the orifice 28 to regulate its effective area and thereby regulate flow of the liquid from the cylinder 10 into the hollow piston 11.

The spring 35 is of such strength that the metering pin 30 is raised a definite amount by each different pressure and velocity of the liquid under normal or anything less than crash landing conditions, and the portion 32 of said metering pin is of such cross sectional areas at different points along its length that for each different position of the metering pin, the effective area of the orifice 28 is such as to permit the exact amount of by-pass of liquid through said orifice from the cylinder 10 into the hollow piston 11 to afford the required resistance by the shock absorber to the load imposed thereon. Thus, the shock absorber, under normal conditions, operates substantially uniformly throughout its stroke to cushion or absorb impact loads to which it is subjected.

As liquid is forced into the hollow piston 11 it compresses the air in said piston and this compressed air acts as a resilient support for the weight of the airplane. Accordingly, when the airplane comes to rest, the liquid pressure in the cylinder 10 is balanced against the air pressure in the piston 11 and the airplane therefore has a soft, flexible taxiing condition. This is particularly true since, although the valve portion 31 of the metering pin 30 closes the orifice 28 under the influence of the spring 35 when the liquid and the air pressures in the shock absorber are balanced, the portion 32 of the metering pin of least cross sectional area is located at the upper end of said portion 32 to enter the orifice 28 simultaneously with upward movement of the valve portion 31 of said metering pin off its seat. Consequently, all slight opening movements of the valve portion 31, such as occur during normal taxiing of the air plane, result in the orifice 28 having a maximum effective area for free flow of liquid therethrough in response to normal impact forces imposed upon the shock absorber as a result of the aircraft encountering slight obstructions or elevations on or in the ground or other surface over which it may be taxiing, thus insuring the soft, flexible taxiing condition mentioned.

Generally speaking, the portion 32 of the metering pin rapidly increases in cross sectional area downwardly a short distance from its upper end portion of least diameter and then gradually and progressively increases in cross sectional area to its lower end. Thus, maximum effective area of the orifice 28 is afforded not only to insure a soft, flexible taxiing condition for the airplane, but to permit a rapid by-pass of liquid from the cylinder 11 into the hollow piston 10 to ease the initial landing impact of the airplane. Thereafter, the effective area of the orifice 28 decreases to cause the shock absorber to progressively increase its resistance to the load imposed thereon whereby it acts smoothly to progressively absorb the load.

In the event of an abnormal or crash landing, the high velocity and pressure of the liquid will result in the metering pin 30 being projected quickly to its uppermost position as determined by engagement of its valve portion 31 with the stop constituted by the lower end of the tube 34, and in turn this will result in the effective area of the orifice 28 being reduced to a minimum. Since, then, the liquid cannot flow through the orifice 28 at a sufficiently rapid rate properly to absorb the load suddenly imposed upon the shock absorber, first the valve 40 or 41 that is held closed by the weaker spring 45 or 46 opens and then, if necessary, the other of said valves opens, under the high pressure of the liquid to permit flow of the liquid through one or both of the bores 38, 39 into the hollow piston 11 to quickly relieve the excessively high pressure. Thereupon, the valve, or valves, 40, 41, as the case may be, is, or are, closed by the spring, or springs, 45, 46 and the metering pin 30 assumes a position, as determined by the reduced pressure and the velocity of the liquid, properly to control its flow through the orifice 28.

The leaf spring 36 acts to buff rapid upward projection of the metering pin 30 beyond the uppermost position which said metering pin assumes in controlling normal impact loads imposed upon the shock absorber, while, obviously, the cam lever 42, in conjunction with the stop or cam actuator 47, varies the strength of the springs 45, 46 in harmony with varying stroke positions of the shock absorber so that for each different stroke position of the shock absorber one or the other or both of the valves 40, 41 will open only under a pressure of the liquid in excess of, but only slightly in excess of, the pressure which the shock absorber is designed to relieve through the orifice 28. Thus, the shock absorber is highly and substantially uniformly efficient throughout its stroke in absorbing impact loads imposed thereon and yet is effectively protected against harm by excessively high pressures generated therein and at the same time serves to protect the airplane against harm under severe impact loads.

The energy of recoil of the shock absorber is dissipated on the one hand by the valve 48 in the piston 23 acting to meter flow of liquid from the portion of the cylinder 20 above said piston 23 to the portion of said cylinder below said piston, all as more fully illustrated and as described in my aforesaid prior application, Serial No. 463,925, and also by flow of liquid from the hollow piston 11 to the cylinder 10 through suitable passageways 49 in the piston head 24 under the control of a check valve 50 which opens toward the cylinder 10 and closes toward the hollow piston 11 and which constantly is urged toward closed position by suitable yieldable means such, for example, as a suitable spring or, alternatively and as shown, by a body of rubber or resilient material which may be the packing 26.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A shock absorber comprising a pair of members movable relative to each other by imposition upon the shock absorber of a force to be resisted, said shock absorber having a liquid-containing chamber wherein the liquid is subjected to pressure by movement of said members relative to each other in response to imposition upon the shock absorber of a force to be resisted and further having an orifice for outlet of liquid from said chamber, means operable in response to the pressure and the velocity of the liquid to regulate its rate of flow through said orifice, yieldably closed pop-off valve means for the relief flow of liquid from said chamber whenever the pressure of the liquid in said chamber exceeds a predetermined value, and cam and cam actuator means operable in response to shock absorber stroke movements of said members relative to each other to impose a different predetermined yieldable closing force upon said pop-off valve means for each different stroke position of said members relative to each other.

2. A shock absorber comprising a pair of members movable relative to each other by imposition upon the shock absorber of a force to be resisted, said shock absorber having a liquid-containing chamber wherein the liquid is subjected to pressure by movement of said members relative to each other in response to imposition upon the shock absorber of a force to be resisted and further having an orifice for outlet of liquid from said chamber, means operable in response to the pressure and the velocity of the liquid to regulate its rate of flow through said orifice, means including a pair of pop-off valves for the relief flow of liquid from said chamber whenever the pressure of the liquid in said chamber exceeds a predetermined value, a separate yieldable means for closing each of said valves, one of said yieldable means being stronger than the other so that only one of said valves opens under a given excessive pressure of the liquid and the other opens under a higher excessive pressure of the liquid, and means operable in response to shock absorber stroke movements of said members relative to each other to vary the pressures exerted by said yieldable means upon said valves in proportion to the strengths of said yieldable means.

3. A shock absorber comprising a pair of members movable relative to each other by imposition upon the shock absorber of a force to be resisted, said shock absorber having a liquid-containing chamber wherein the liquid is subjected to pressure by movement of said members relative to each other in response to imposition upon the shock absorber of a force to be resisted and further having an orifice for outlet of liquid from said chamber, means to regulate flow of liquid through said orifice, means including a pop-off valve for the relief flow of liquid from said chamber whenever the pressure of the liquid in said chamber exceeds a predetermined value, a spring maintaining said pop-off valve normally closed, a pivoted lever operable by swinging movement thereof to vary the pressure of said spring, and means operable in response to shock absorber stroke movements of said members relative to each other to swing said lever so that for each different stroke position of said members relative to each other said spring exerts a different predetermined closing pressure upon said pop-off valve.

4. A shock absorber comprising a pair of members movable relative to each other by imposition upon the shock absorber of a force to be resisted and further comprising a liquid-containing chamber in which the liquid is subjected to pressure by movement of said members relative to each other in response to imposition upon the shock absorber of a force to be resisted, valve means to be opened by the pressure of the liquid to control flow of the liquid from said chamber, yieldable means exerting a closing force upon said valve means, and cam and cam actuator means operative in response to movement of said members relative to each other to vary the force of said yieldable means exerted upon said valve means.

5. A shock absorber comprising a pair of members movable relative to each other by imposition upon the shock absorber of a force to be resisted and further comprising a liquid-containing chamber in which the liquid is subjected to pressure by movement of said members relative to each other in response to imposition upon the shock absorber of a force to be resisted, a pair of valves to be opened by the pressure of the liquid to permit relief flow of the liquid from said chamber, a separate yieldable means tending constantly to close each of said valves, said valves being of such areas and said yieldable means being of such strengths that one of said valves opens under a given pressure and the other opens only under a higher pressure of the liquid, and means operative in response to shock absorber stroke movements of said members relative to each other to vary the pressures exerted by said yieldable means upon said valves in proportion to the strengths of said yieldable means.

6. A shock absorber comprising a pair of members movable relative to each other by imposition upon the shock absorber of a force to be resisted and further comprising a liquid-containing chamber in which the liquid is subjected to pressure by movement of said members relative to each other in response to imposition upon the shock absorber of a force to be resisted, a pair of valves to be opened by the pressure of the liquid to permit relief flow of the liquid from said chamber, a separate yieldable means tending constantly to close each of said valves, said valves being of such areas and said yieldable means being of such strengths that one of said valves opens under a given pressure and the other opens only under a higher pressure of the liquid, and cam and cam actuator means common to both of said yieldable means and operative in response to shock absorber stroke movements of said members relative to each other to vary the pressures exerted by said yieldable means upon said valves in proportion to the strengths of said yieldable means.

NEVIN S. FOCHT.